United States Patent
Reilly et al.

(10) Patent No.: US 9,516,169 B2
(45) Date of Patent: Dec. 6, 2016

(54) AUTOMATIC CONTACT CENTER EXPANSION AND CONTRACTION

(71) Applicant: Avaya Inc., Santa Clara, CA (US)

(72) Inventors: John Reilly, Galway (IE); Dawid Nowak, Dublin (IE); John McGreevy, Galway (IE); Siobhán Dervan, Galway (IE); Tom Eustace, County Clare (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/562,456

(22) Filed: Dec. 5, 2014

(65) Prior Publication Data

US 2016/0165052 A1   Jun. 9, 2016

(51) Int. Cl.
| H04M 3/00 | (2006.01) |
| H04M 5/00 | (2006.01) |
| H04M 3/523 | (2006.01) |

(52) U.S. Cl.
CPC ......... *H04M 3/5238* (2013.01); *H04M 3/5233* (2013.01); *H04M 2203/402* (2013.01)

(58) Field of Classification Search
CPC .............. H04M 3/523; H04M 3/5232; H04M 2203/401; H04M 2203/407; H04M 2203/40
USPC ........................... 379/265.1, 265.11, 265.05, 265.01,379/265.06
See application file for complete search history.

(56) References Cited

U.S. PATENT DOCUMENTS

| 5,185,780 A * | 2/1993 | Leggett ................. G06Q 10/06 379/111 |
| 7,382,773 B2 * | 6/2008 | Schoeneberger ... H04L 41/5064 370/353 |
| 8,634,543 B2 | 1/2014 | Flockhart et al. |
| 8,964,958 B2 | 2/2015 | Steiner |
| 2010/0235218 A1 | 9/2010 | Erhart et al. |
| 2011/0125793 A1 | 5/2011 | Erhart et al. |
| 2011/0125826 A1 | 5/2011 | Erhart et al. |
| 2012/0087486 A1 | 4/2012 | Guerrero et al. |
| 2014/0079207 A1 | 3/2014 | Zhakov et al. |
| 2014/0081636 A1 | 3/2014 | Erhart et al. |
| 2015/0142527 A1* | 5/2015 | Nowak ............. G06Q 10/0639 705/7.38 |

* cited by examiner

*Primary Examiner* — Thjuan K Addy
(74) *Attorney, Agent, or Firm* — Sheridan Ross P.C.

(57) ABSTRACT

A contact center, methods, and mechanisms are provided for dynamically scaling a contact center based on scaling triggers and monitored activity. The monitored activity includes information provided from one or more sources. This information serves to indicate whether a contact center activity is increasing, decreasing, or maintaining a steady-state. When the activity at a contact center is increasing, a scaling mechanism increases a number of resources provisioned to the contact center according to rules. When the activity at a contact center is decreasing, a scaling mechanism decreases a number of resources provisioned to the contact center according to rules. The scaling triggers are created, removed, modified, or otherwise classified as correlations between monitored activity and contact center scaling are observed.

20 Claims, 6 Drawing Sheets

Fig. 4

400 — Resource Additions (404) | Resource Subtractions (408) | Contact Volume (412) | Contact Center Locations (416) | Contact Center Attributes (420) | Data Volume (424) | ... (428)

Fig. 5

500 — Economic Factor(s) (504) | Supply Factor(s) (508) | Demand Factor(s) (512) | Technology Factor(s) (516) | Regulations (520) | Usage (524) | ... (528)

AUTOMATIC CONTACT CENTER EXPANSION AND CONTRACTION

FIELD OF THE DISCLOSURE

The present disclosure is generally directed toward communication systems.

BACKGROUND

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. These resources may be provisioned, or retained, by the contact center to handle a predetermined demand associated with the contact center.

As products and problems become more complex and diverse in nature, and as contact center activity varies with time, it becomes more difficult to provision, or retain, resources based on a predetermined, or expected, demand. Provisioning more resources than are required to handle the expected demand can result in an economic burden on a company. On the other hand, provisioning fewer resources than are required to handle the expected demand can result in customer dissatisfaction.

It is one goal of a contact center to maintain good customer service when handling contacts, and as such, work items representing the contacts are typically assigned to qualified agents in a timely and efficient manner. In some cases, however, work items cannot be assigned to resources in such a manner. For example, a contact center may not have the qualified resources to handle a particular work item. As another example, all of the qualified resources of a contact center may be busy or unavailable. In any event, suboptimal assignments or long wait times may result and contact center performance as well as long-term customer service may suffer.

SUMMARY

Like most businesses, contact centers would like to be able to expand and contract based at least part on changes in market conditions (e.g., economy, supply, demand, technology, and/or regulations, etc.) usage, and/or other factors. As provided above, the traditional model of a contact center is not designed to flexibly adapt to changing market conditions or use. Historically, contact center changes are made manually by an administrator and/or are provided through a software and/or hardware upgrade to one or more components of a contact center. When these changes are not made, or are not made fast enough, resources can be wasted and inefficiencies can linger. Waste and inefficiency generally results in a loss of revenue and loss of productivity for a company.

It is with respect to the above issues and other problems that the embodiments presented herein were contemplated. Among other things, the present disclosure provides methods, devices, and systems that enable a contact center to automatically and dynamically scale itself (e.g., expand and/or contract a number of provisioned resources at an enterprise) based on one or more triggers generated in response to detected activity (e.g., activity data, etc.) associated with the contact center. In one embodiment, a plug-in module is provided that collects and publishes a number of metrics based on the activity data associated with the contact center. In any event, the activity data may be produced by one or more information sources and, based at least partially on the activity data, a scaling mechanism can produce triggers to change the contact center size and/or resource usage.

In some embodiments, the activity data may be collected and/or maintained by one or more components of a scaling mechanism. For instance, a scaling mechanism may include a context engine and a memory. One example of these one or more components may include Avaya's Context Store snap-in application. The Context Store is an Avaya Aura® Collaboration Environment snap-in that can enable context-sensitive, real-time customer contact information to be updated from multiple sources and shared between the various components and touch points in the enterprise through which a customer passes. As provided above, the context engine may be an application that is central to an enterprise, as a bridging technology that can allow many disparate applications and/or information sources to communicate and share data. As the context engine is central to much of the dynamic traffic that flows through the enterprise, activity data provided by the context engine can serve as an indicator of the level of activity and/or inactivity that is happening in the enterprise. In one embodiment, the present disclosure provides utilizing analytical data from the context engine to generate scaling triggers that can be used by the scaling mechanism in dynamically scaling an enterprise. Scaling the enterprise may include expanding and/or contracting a contact center by provisioning and/or releasing resources.

For example, as a contact center dynamically consumes resources, the context engine may monitor and even store information related to resource additions, resource subtractions, increases in contact center contact volume, decreases in contact center contact volume, increases in "elite" contact centers and/or resources added, increases in the number of contact centers and/or resources added, etc., and/or combinations and/or variations thereof. This monitored and/or stored information can serve as an indicator of how an enterprise, or contact center, is growing or shrinking over time.

The context engine can provide for storage of data in an unstructured format, but in some cases may not store any data about an agent. The context engine may be designed to store information related to handling a customer interaction (e.g., a link to a webpage that the customer is viewing, comments added by an agent who handled the call previously, etc.). The information may be related to each through key-based mechanism. For example, the context engine may utilize eXtreme Application Platform (XAP) provided by GigaSpaces. XAP and other implementations of Key-Value stores can provide functionality to automatically scale the context engine based on current load/hardware utilization or memory consumption. XAP and other technologies have mechanisms to publish some usual system utilization data (CPU, memory, load, etc.).

In some embodiments, the scaling mechanism disclosed herein may include a context engine, which may be a plug-in to at least one application development platform that monitors the activity of the context engine and may use scaling units and resource requirements. The scaling units may be predefined and/or defined by a particular contact center, or enterprise. The applications may independently interpret multiple metrics that are published by the plug-in monitoring the context engine. In one embodiment, the plug-in can publish many metrics based on the activity of the context engine, which is multi-faceted.

It is an aspect of the present disclosure that activity data can indicate whether a contact center requires a scaling input to be generated. In other words, activity data can serve as a trigger to expand or contract a contact center. By way of example, a number of new keys created in association with contact center may indicate a number of new interactions at the contact center. As can be appreciated, a rapidly growing number of new keys created per unit of time (e.g., second, hour, day, month, etc., and/or fractions thereof) can indicate a spike in contact center traffic, or contact volume. This spike in contact center traffic may require that more agents or resources are made available to the contact center. Conversely, the rate of new keys created may fall below an average value, predetermined threshold value, and/or the like, and as such, one or more agents or resources may be released from the contact center.

As another non-limiting example of scaling triggers, the lifetime of a key can serve as a trigger to dynamically scale a contact center. For instance, the key lifetime associated with an interaction may indicate a problem with a particular interaction when the key lifetime is longer than a predetermined threshold (e.g., an average lifetime, etc.). This longer key lifetime may indicate that a customer is returning with a complaint and is thus engaging resources of the contact center for a longer than expected period of time. Additionally or alternatively, longer key lifetimes may indicate that problems being addressed by resources of a contact center are more difficult, outside of an area of expertise of the resources, and/or require attributes that exist outside of the attribute set of the resources of the contact center. In yet another example, shorter key lifetimes (e.g., shorter than a predetermined threshold, etc.) may serve to indicate that problems are being handled quickly and efficiently. In any event, the key lifetimes may serve as a trigger to scale the contact center (e.g., by adding and/or subtracting resources, etc.)

As yet another non-limiting example of a scaling trigger, the size of data stored may serve as a trigger to dynamically scale a contact center. In one embodiment, the size of data may be stored in the context engine as described above. Additionally or alternatively, a rate of growth of the data stored may serve as a trigger to dynamically scale a contact center. For instance, as the data stored with one or more interaction grows, or passes a predetermined threshold value, the scaling mechanism may determine that there is a problem with the interaction (e.g., the agent or resource handling the customer contact is not adequately qualified to handle the contact, etc.). In some embodiments, the scaling mechanism may review the attributes of the assigned resource and determine whether a resource with more skills and/or attributes would be better suited to handle the customer contact. In this case, the scaling mechanism may determine that the customer contact be routed to a more-skilled agent.

Although embodiments of the present disclosure are described in conjunction with the context engine, it should be appreciated that the present disclosure can utilize any application, module, engine, memory, mechanism, and/or combinations thereof in monitoring and storing activity data associated with a contact center. In one embodiment, this activity data may be provided by information sources internal to a contact center (e.g., work assignment mechanisms, resources, routing engines, switches, etc.). In some embodiments, this activity data may be provided by information sources external to a contact center. For instance, an information source may include an Internet chat room, social network, forum, or other entity. In any event, embodiments of the present disclosure provide mining data from the information provided by one or more of the information sources disclosed herein to determine, or infer, a trend and make scaling decisions based at least partially on the trend. Examples of data mining information and inferring trends are more fully described in U.S. Patent Publication No. 2014/0081636, the entire contents of which are hereby incorporated herein by reference for all that they teach and for all purposes.

The scaling mechanism may be configured to continually reevaluate a state of a contact center for scaling. The reevaluation may include determining whether a data structure associated with a work item, resource, market condition, etc., changes from a first time to a second time. Determining a change in the data structure of can indicate that needs and/or desires of a contact center have changed. Among other things, this continual reevaluation of the scaling mechanism can serve to dynamically scale a contact center based at least partially on the changing needs of the contact center. In one example, the scaling mechanism may generate instructions for a work assignment mechanism to reserve, release, or otherwise allocate resources to suit a scaling trigger and contact center state.

As provided herein, a resource may possess one or more attributes which can include, without limitation, language ability, fluency for a language, level of understanding for a language, skill (e.g., billing, customer service, troubleshooting, accounts receivable, accounts payable, product knowledge, departments, etc.), skill level (e.g., trainer, trainee, expert, associate, etc.), willingness to participate, attitude rating (e.g., via peer, customer, supervisor, technical, survey, etc.), gender, age, nationality, experience, historical KPIs (e.g., call resolution rate, close rate, conversion rate, etc.), busyness, location, availability, presence information, preferred communication type (e.g., media, medium, real-time, near-real-time, non-real-time, etc.), communication device type, and combinations thereof.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures:

FIG. 4 is a block diagram depicting an activity data structure used in accordance with embodiments of the present disclosure;

FIG. 5 is a block diagram depicting a triggering data structure used in accordance with embodiments of the present disclosure;

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
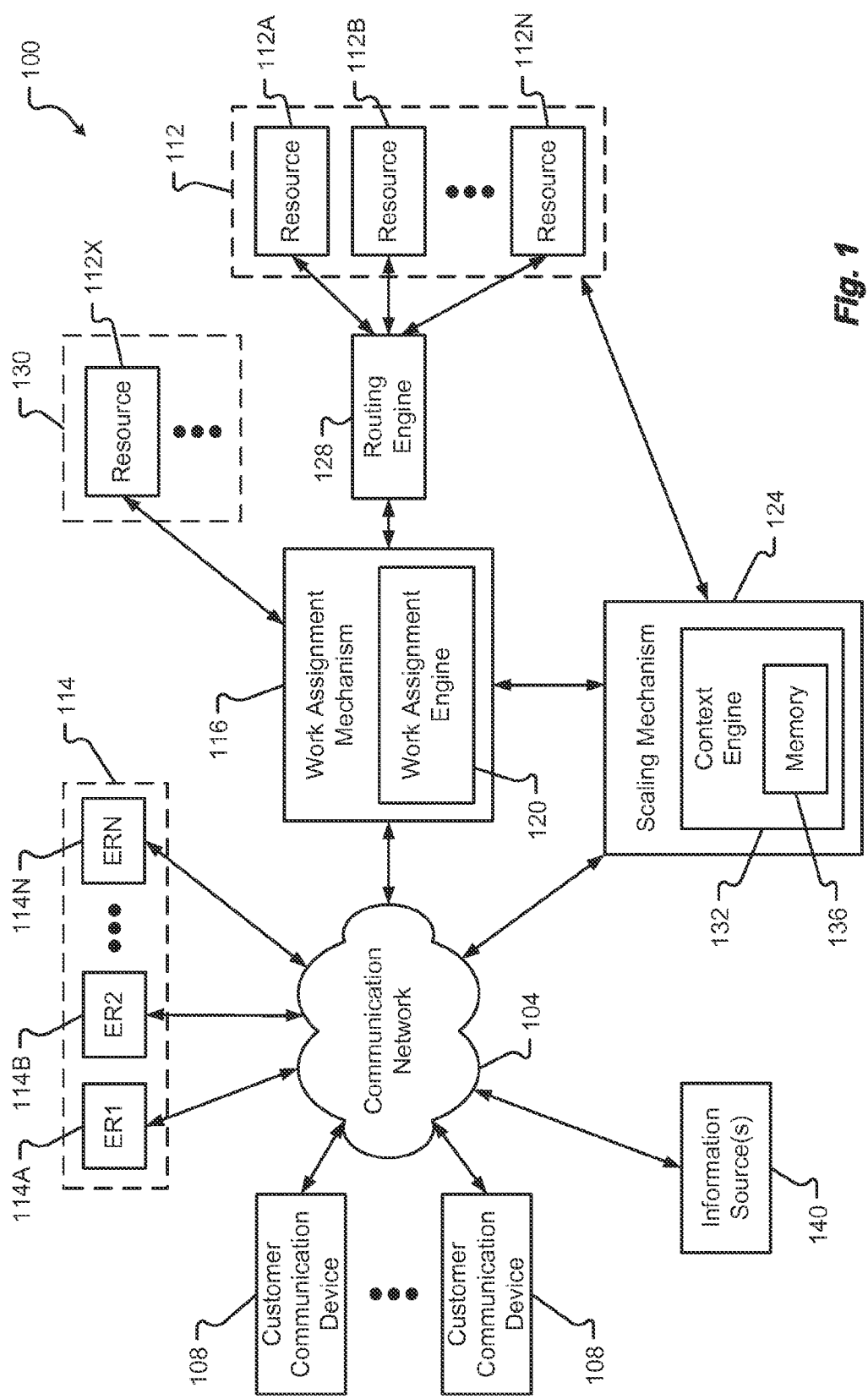
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of provisioned resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference for all that it teaches and for all purposes. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112A-N, 114A-N, 112X. Examples of work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and Ser. No. 12/707,277, filed Mar. 20, 2010, Feb. 17, 2010, and Feb. 17, 2010, respectively, each of which are hereby incorporated herein by reference in their entirety for all they teach and for all purposes.

The format of the work item may depend upon the capabilities of the communication device 108 and the format of the communication. In some embodiments, work items are logical representations within a contact center of work to be performed in connection with servicing a communication received at the contact center (and more specifically the work assignment mechanism 116).

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, tablet, mobile computer, or combinations thereof. In general each communication device 108 may be adapted to support video, audio, text, and/or data communications with other communication devices 108 as well as the processing resources 112A-N, 114A-N, 112X. The type of medium used by the communication device 108 to communicate with other communication devices 108 or processing resources 112A-N, 114A-N, 112X may depend upon the communication applications available on the communication device 108.

In accordance with at least some embodiments of the present disclosure, the work item is sent toward a collection of provisioned processing resources 112 via the combined efforts of the work assignment mechanism 116 and routing engine 128.

The resources 112A-N, 114A-N, 112X can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers, and may include contact centers.

As discussed above, the work assignment mechanism 116 and resources 112A-N, 114A-N, 112X may be owned and operated by a common entity in a contact center format. In some embodiments, the work assignment mechanism 116 may be administered by multiple enterprises, each of which has their own dedicated resources 112A-N, 114A-N, 112X connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference for all that it teaches and for all purposes.

More specifically, the work assignment engine 120 can determine which of the plurality of processing resources 112A-N, 114A-N, 112X is eligible and/or qualified to receive a work item and further determine which of the plurality of processing resources 112A-N, 114A-N, 112X is best suited to handle the processing needs of the work item. In situations of work item surplus, the work assignment engine 120 can also make the opposite determination (i.e., determine optimal assignment of a work item to a resource). In some embodiments, the work assignment engine 120 is configured to achieve true one-to-one matching.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In some embodiments, the work assignment mechanism 116 may operate to assign resources and work items in conjunction with a scaling mechanism 124. The scaling mechanism 124 may be configured as a module that is capable of monitoring and/or storing information related to work items, resources 112A-N, 114A-N, 112X, work assignments, market conditions, usage, and/or other activity data provided by the one or more components of the contact center in determining whether to scale the contact center. Additionally or alternatively, the scaling mechanism 124 may be configured to receive activity data from one or more information sources 140 in determining whether to scale the contact center. Analysis of a work item can include, but is not limited to, determining a customer identification, work item information, subject matter, attributes, service level, historical data, average time of handling (e.g., including wait times, processing time, disposition time, etc.), past performance, and/or the like.

The scaling mechanism 124 may include a context engine 132 and a memory 136. The context engine 132 may be configured to monitor activity data from one or more sources of the contact center. These one or more sources can include, but are not limited to, the one or more components of the contact center shown in FIG. 1. For instance, the context engine 132 may monitor activity data generated by one or more of the customer communication devices 108, resources 112A-N, 114A-N, 112X, work assignment mechanism 116, work assignment engine 120, routing engine 128, information sources 140, etc. Information sources 140 can include, but are not limited to, social networks, Internet chat rooms, forums, user groups, search queries, search engine queries, servers, websites, interactive forms, etc., and/or combinations thereof. In any event, activity data generated by the one or more sources may be stored in memory 136.

Although shown as residing in the scaling mechanism 124, the memory 136 may be external to the context engine 132 and/or the scaling mechanism 124. For example, the memory 136 may be maintained in the work assignment engine 120, the work assignment mechanism 116, and/or elsewhere that can be accessed by the scaling mechanism 124. In accordance with embodiments of the present disclosure, it is anticipated the memory 136 and/or any other memory accessed during the dynamic contact center scaling can be located remotely from, or directly connected to, the contact center. Additionally, the memory 136 may also refer to partitions and/or sections of a memory structure and need not be directed to an entire memory structure. It is anticipated that the scaling mechanism 124 may be external or internal to the work assignment mechanism 116 and even the work assignment engine 120.

In any event, as data is received by the context engine 132, the scaling mechanism 124 may access rules stored in memory to determine whether a scaling trigger should be generated. These rules may be stored remotely, or apart, from the scaling mechanism 124 or context engine 132. In some cases, the rules may be stored locally to the context engine 132 or scaling mechanism 124. For example, the rules may be stored in memory 136. It is anticipated that the scaling mechanism 124 may be configured to generate instructions for reserving and/or releasing resources 112A-N, 114A-N, 112X in scaling a contact center.

In some embodiments, scaling a contact center may include adding or removing resources from a temporally-defined group of provisioned resources 112 associated with the contact center. Provisioned resources 112 can refer to one or more resources that are at least temporarily available and/or assigned to handle work items of a contact center at a given point in time. As shown in FIG. 1, the provisioned resources 112 may include resources 112A-N. This group of provisioned resources 112 may be expanded to include one or more resources 112X that are part of an unprovisioned group of resources 130 internal to the contact center, other contact centers, one or more external resources 114A-N that are part of an unprovisioned group of external resources 114 external to the contact center, combinations thereof, and the like.

As can be appreciated, the number of resources included in the group of provisioned resources 112 can expand or contract based on instructions provided by the scaling mechanism 124. For instance, where activity data monitored causes the scaling mechanism 124 to generate an expansion scaling trigger, the scaling mechanism 124 can provide a scaling output to add one or more resources 112X, 114A-N that are not yet provisioned in the group of provisioned resources 112. Adding resources may include reserving the resource for use in a particular group of resources. In the example above, the added one or more resources 112X, 114A-N become a part of the group of provisioned resources 112 for a period of time. This period of time may be predetermined, calculated at the time of generating the scaling trigger, calculated at the time of providing the scaling output, conditional (e.g., based on a state of the contact center, work assignment allocation, percentage allocation, etc.), and/or renewable upon the expiration of a timer. Additionally or alternatively, where activity data monitored causes the scaling mechanism 124 to generate a contraction scaling trigger, the scaling mechanism 124 can provide a scaling output to remove one or more resources 112A-N from the group of provisioned resources 112. In this case, the removed one or more resources 112A-N can be released to at least one unprovisioned group of resources 114, 130, whether internal or external to a contact center. These one or more resources 112A-N may be released on a temporary, permanent, or semi-permanent basis, for a period of time, conditionally, and/or combinations thereof.

Reservations of resources 112 may include marking, via the work assignment mechanism 116, a particular resource 112A-N, 114A-N, 112X as reserved for a period of time and/or a percentage of utilization. In some embodiments a data structure associated with the resource 112A-N, 114A-N, 112X may be modified to include a reservation status. In one embodiment, the reservation status associated with one or more resources 112A-N, 114A-N, 112X may be stored in a memory (e.g., as information in a table, data structure, and/or other accessible construct). For instance, reservations and/or reservation status may be stored in memory 136.

Resources 112A-N, 114A-N, 112X may be released from a reservation, for example, via the work assignment mechanism 116 or the scaling mechanism 124. Releasing a resource 112A-N, 114A-N, 112X from reservation may include resetting a reservation status value associated with the resource 112A-N, 114A-N, 112X. In one embodiment, a data structure associated with the resource 112A-N, 114A-N, 112X may be modified to include a released status. In any event, releasing a resource 112A-N, 114A-N, 112X may allow the resource 112A-N, 114A-N, 112X to return to a work pool for other work assignments (e.g., made via the work assignment mechanism 116, etc.) and/or scaling operations (e.g., made via the scaling mechanism 124, etc.).

It is an aspect of the present disclosure that the scaling mechanism 124 may communicate with the work assignment mechanism 116, its components, and/or other contact center components (e.g., the routing engine 128, resources 112A-N, 114A-N, 112X, and the like). Work items may be routed at the direction of the scaling mechanism 124 and/or work assignment engine 120. The routing may include directing the work item to one or more resources 112A-N of a group of provisioned resources 112. Additionally or alternatively, the routing may include altering the assignment of a work item as directed by the work assignment engine 120. In other words, the scaling mechanism 124 may be incorporated into the work assignment engine 120.

Figure 2:
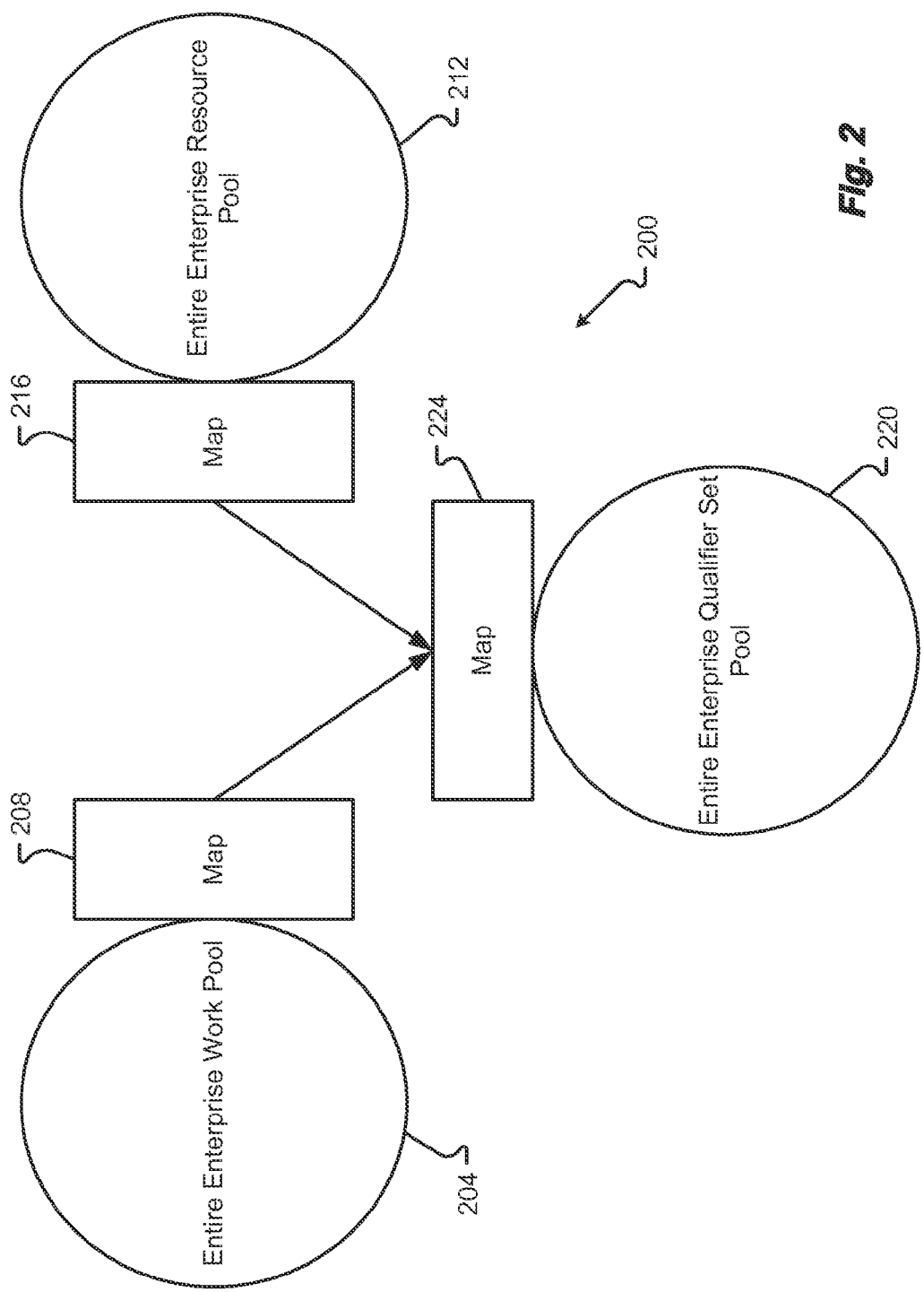
FIG. 2 is a block diagram depicting exemplary pools and bitmaps that are utilized in accordance with embodiments of the present disclosure.

FIG. 2 depicts exemplary data structures 200 which may be incorporated in or used to generate bitmaps/tables used by the work assignment engine 120. The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center.

In some embodiments, the population of the work pool 204 may be limited to work items waiting for service by a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224.

In some embodiments, the bitmaps are utilized to speed up complex scans of the pools and help the work assignment engine 120 make an optimal work item/resource assignment decision based on the current state of each pool. Additionally or alternatively, the bitmaps may be utilized by the scaling mechanism 124 in efficiently identifying and managing resources. Accordingly, the values in the bitmaps 208, 216, 224 may be recalculated each time the state of a pool changes (e.g., when a work item surplus is detected, when a resource surplus is detected, and/or when rules for administering the contact center have changed).

Figure 3:
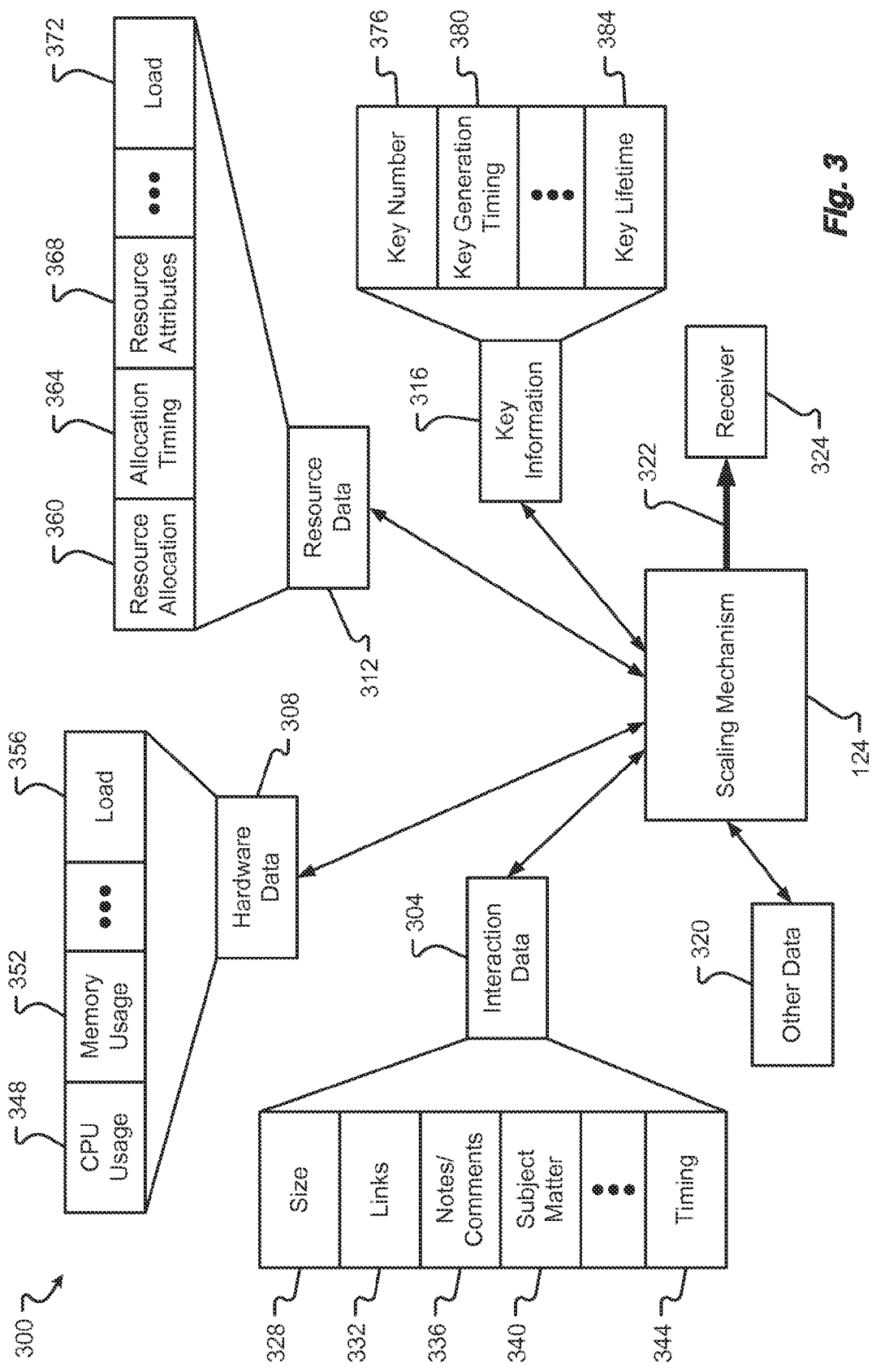
FIG. 3 is a block diagram depicting activity data and data structures associated therewith used by a scaling mechanism in accordance with embodiments of the present disclosure.

Referring now to FIG. 3, a block diagram 300 of activity data used by the scaling mechanism 124 is shown in accordance with embodiments of the present disclosure. In particular, the scaling mechanism 124, or at least one of its components, may be configured to receive data from one or more sources. This data may be received and stored over time. Activity information may be determined by monitoring changes to the data stored over time. This data may include activity data that is contained in one or more data structures of various data types. When the scaling mechanism 124 determines that the activity data corresponds to a scaling trigger, the scaling mechanism 124 can provide a scaling output 322 to a receiver 324. In some embodiments, the receiver 324 may correspond to a work assignment mechanism 116, at least one resource 112A-N, 112X, 114A-N, a routing engine 128, another contact center, and/or other component of the contact center.

In some embodiments, data may be received by and/or categorized into one or more types of data. For example, the types of data may include at least one of, interaction data 304, hardware data 308, resource data 312, key information 316, and/or other data 320. It should be appreciated that the scaling mechanism 124 may analyze the received data for specific activity data. This activity data may correspond to particular data, or sets of data, for generating a scaling trigger. When a scaling trigger is generated, the scaling mechanism 124 can refer to one or more rules in memory to determine whether a scaling output 322 should be provided to a receiver 324. For example, a scaling mechanism 124 may receive hardware data 304 showing that a CPU usage 348 is increasing over time. Continuing this example, the scaling mechanism 124 may further receive resource data 312 showing that a percentage of allocated resources (e.g., from resource allocation field 360) associated with the contact center is increasing over time. The scaling mechanism can dynamically determine (e.g., by combining information obtained from these separate data sets, etc.) that an activity of the contact center requires a scaling trigger to be generated. In some embodiments, for example, when the activity data causing the scaling trigger reaches a threshold value, the scaling mechanism 124 may provide a scaling output 332. In some embodiments, the scaling mechanism 124 may be configured to determine a scaling trigger and provide a scaling output using any one or more of the data fields shown in FIG. 3.

The interaction data type 304 may have a corresponding data structure comprising one or more fields which identify the size of data associated with an interaction in a size information field 328, identify one or more links to sites and/or pages that the customer is viewing or has viewed in a links information field 332, provide notes and/or comments associated with the interaction in a notes/comments information field 336, identify subject matter of the work item associated with the interaction in a subject matter information field 340, provide timing data associated with the interaction in a timing information field 344, and more.

The size information field 328 may comprise data that identifies the size of data (e.g., in bits, bytes, megabytes, terabytes, etc., and/or fractions thereof) associated with one or more customer interactions. In some embodiments, the size of data may be associated with one or more times and/or timestamps. This field 328 may be used by the scaling mechanism 124 in determining whether a particular interaction or number of interactions is increasing over time. For instance, an increase in the size of data associated with interactions may indicate that a contact center should be expanded. The information provided by the size information field 328 may be used alone or in combination with any other data field by the scaling mechanism 124 in determining to generate a scaling trigger and/or provide a scaling output.

The links information field 332 may comprise data that identifies one or more addresses of websites, pages, network locations, visited and/or viewed by a customer. The one or more addresses may be stored as a link, an Internet Protocol address, a network address, a uniform resource locator (URL), combinations thereof, and the like. In some embodiments, the one or more addresses may be stored along with an identification or description of the one or more addresses. This field 332 may be used by the scaling mechanism 124 in determining whether a particular interaction or number of interactions has exhausted a number of possible solutions. For instance, as the number of links provided by this field increases over time, the more likely it is that the interaction is not being adequately handled. The information provided by the links information field 332 may be used alone or in combination with any other data field by the scaling mechanism 124 in determining to generate a scaling trigger and/or provide a scaling output.

The notes/comments information field 336 may comprise data that identifies any notes and/or comments provided by a resource handling a work item. In one embodiment, the notes/comments field 336 may include information created by a resource that previously handled the work item. The scaling mechanism 124 may receive information from this field 336 and analyze the content for keywords, phrases, or other information. Among other things the content in the notes/comments information field 336 may be used by the scaling mechanism 124 in defining patterns, a commonality between work items, and/or elements that serve as a scaling trigger. The information provided by the notes/comments information field 336 may be used alone or in combination with any other data field by the scaling mechanism 124 in determining to generate a scaling trigger and/or provide a scaling output.

The subject matter information field 340 may comprise one or more bits or bit values which identify the subject matter area that is used to appropriately route the work item to one or more resources of the contact center. This field 340 may include general or specific information relating to the subject matter of the work item. For example, a sample work item may wish to inquire about implementing SIP presence functionality in an existing telecommunications system. As such, the subject matter information filed 340 may be coded to identify SIP presence and implementation as the appropriate subject matter to be used in routing and/or assigning the work item to one or more resources 112A-N. As another example, one or more work items made over time may include "real estate transaction" as a subject matter in the field 340. In response, the scaling mechanism 124 can determine that the contact center may require an increase in resources having attributes that match this subject matter based. The information provided by the subject matter information field 340 may be used alone or in combination with any other data field by the scaling mechanism 124 in determining to generate a scaling trigger and/or provide a scaling output.

The timing information field 344 may comprise data corresponding to a number of interactions, or work items, created at a contact center at a given point in time. The timing information stored in the field 344 may include an instance or number of instances of interactions associated with one or more times. These times can be represented by a timestamp, time value, iteration value, increment value, decrement value, or other timing value. For instance, the data in this field 344 may indicate that 30 new interaction instances are created at a first time, while 40 new interaction instances are created at a second time. Additionally or alternatively, the data in this field 344 may provide that a certain number of interaction instances are completed or removed at a first time, second time, etc. In one embodiment, the interaction instances may include a value representing existing interaction instances (e.g., interactions that have not yet been completed, etc.) at a first time, second time, etc. In any event, each number of interaction instances may include a time. This timing information can be used by the scaling mechanism 124 in determining increases to traffic, call volume, contact volume, etc., over time. The information provided by the timing information field 344 may be used alone or in combination with any other data field by the scaling mechanism 124 in determining to generate a scaling trigger and/or provide a scaling output.

The hardware data type 308 may have a corresponding data structure comprising one or more fields which identify processor usage information in a CPU usage field 348, identify contact center memory usage in a memory usage field 352, provide traffic, switching, and/or other processing load data associated with the contact center hardware in a load information field 356, and more.

The CPU usage field 348 may comprise data that identifies a percentage of processing hardware resources used in the contact center. The field 348 may include an amount of time that the CPU is processing instructions of at least one application associated with the contact center. In some embodiments, the field 348 may include how many processing resources available at the contact center are being utilized (e.g., processing instructions, etc.) at a given point in time. As can be appreciated, the CPU usage field 348 may include a percentage of utilization accompanied by one or more times and/or timestamps. This field 348 may be used by the scaling mechanism 124 in determining whether hardware utilization is increasing, decreasing, or maintaining a constant level over time. Increases in hardware utilization may serve to indicate that the contact center will require an expansion scaling (e.g., by adding additional contact centers, resources, servers, and/or other processing resources, etc.). The information provided by the CPU usage field 348 may be used alone or in combination with any other data field by the scaling mechanism 124 in determining to generate a scaling trigger and/or provide a scaling output.

The memory usage field 352 may comprise data that identifies a percentage of memory resources used in the contact center. The memory usage field 352 may include a total amount of utilized memory (e.g., uncleared and/or reserved memory locations, etc.) associated with the contact center. In some embodiments, the memory usage field 352 may include how much memory is utilized by the contact center (e.g., RAM, or other temporary memory storage, etc.) at a given point in time. As can be appreciated, the memory usage field 352 may include a percentage of utilization accompanied by one or more times and/or timestamps. This field 352 may be used by the scaling mechanism 124 in determining whether hardware utilization is increasing, decreasing, or maintaining a constant level over time. Increases in hardware utilization may serve to indicate that the contact center will require an expansion scaling (e.g., by adding additional contact centers, resources, servers, and/or other memory resources, etc.). The information provided by the memory usage field 352 may be used alone or in combination with any other data field by the scaling mechanism 124 in determining to generate a scaling trigger and/or provide a scaling output.

The load information field 356 may comprise data that identifies a percentage of hardware resources used in the contact center. The load information field 356 may include a monitored load of the contact center at a given point in time. In some embodiments, the load of a contact center may be represented as a value of the load as compared to one or more threshold values. For instance, the load information field 356 may include information classifying a load of the contact center system as acceptable (e.g., low or normal), unacceptable (e.g., high), and/or other classifications and/or levels of classification therebetween. As can be appreciated, the load information in the field 356 may include a percentage of utilization accompanied by one or more times and/or timestamps. This field 356 may be used by the scaling mechanism 124 in determining whether hardware utilization is increasing, decreasing, or maintaining a constant level over time. Increases in hardware utilization may serve to indicate that the contact center will require an expansion scaling (e.g., by adding additional contact centers, resources, servers, and/or other hardware resources, etc.). The information provided by load information field 356 may be used alone or in combination with any other data field by the scaling mechanism 124 in determining to generate a scaling trigger and/or provide a scaling output.

The resource data type 312 may have a corresponding data structure comprising one or more fields which identify allocation information associated with one or more resources of a contact center in a resource allocation information field 360, identify timing associated with the allocation of resources in an allocation timing information field 364, attribute information of the resources of a contact center in a resource attributes information field 368, provide resource load data associated with the contact center resources in a resource load information field 372, and more.

The resource allocation information field 360 may comprise data that identifies a percentage of resources allocated in a contact center. The information may include whether one or more resources (e.g., provisioned resources 112 and/or unprovisioned resources 130, etc.) are assigned to a work item, busy, unavailable, assigned to a work break, assigned to training, combinations thereof, and/or other allocation information. This field 360 may be used by the scaling mechanism 124 in determining whether one or more particular resources are utilized more than others. Utilization of one or more particular resources in a contact center may serve to indicate that the contact center will require an expansion scaling (e.g., by adding additional particular resources, and/or other resources having attributes of the particular resources utilized, etc.). The information provided by the resource allocation information field 360 may be used alone or in combination with any other data field by the scaling mechanism 124 in determining to generate a scaling trigger and/or provide a scaling output.

The allocation timing information field 364 may comprise data that identifies a timing associated with the allocation of one or more resources in a contact center. The information in this field 364 may include a time of when one or more resources were assigned to a work item, a time or value representing how long a resource has been assigned to a work item, an average time that a resource is assigned to a work item, and/or other allocation timing information. This field 364 may be used by the scaling mechanism 124 in determining whether resource allocation is increasing, decreasing, or maintaining a constant level over time. Increases in resource allocation may serve to indicate that the contact center will require an expansion scaling (e.g., by adding additional contact centers, resources, servers, and/or other resources, etc.). The information provided by the allocation timing information field 364 may be used alone or in combination with any other data field by the scaling mechanism 124 in determining to generate a scaling trigger and/or provide a scaling output.

The resource attributes information field 368 may comprise one or more bits or bit values that identify any required or requested attributes of resources associated with one or more work items. In some embodiments, the work assignment mechanism 116 or its various components (e.g., the work assignment engine 120, etc.) and/or the scaling mechanism 124 or its various components (e.g., the context engine 132, etc.), may utilize information contained in the resource attributes information field 368 to match a work item with a resource, or vice versa. As such, one or more of the attributes contained in the resource attributes information field 368 may be matched to one or more attributes associated with a suitable resource. For example, the field 368 may include "English" as a required attribute. In one embodiment, the "English" required attribute may indicate that any information (e.g., speech, text, multi-media, etc.) communicated to the contact must be presented in English. Continuing this example, the scaling mechanism 124 may determine to expand the contact center by adding one or more resources that possess the required attribute "English." The information provided by the resource attributes information field 368 may be used alone or in combination with any other data field by the scaling mechanism 124 in determining to generate a scaling trigger and/or provide a scaling output.

The resource load information field 372 may comprise data that identifies a percentage of resources used in the contact center. The resource load information field 372 may include a monitored resource load of the contact center at a given point in time. In some embodiments, the resource load of a contact center may be represented as a value of the resource load as compared to one or more threshold values. For instance, the resource load information field 372 may include information classifying a resource load of the contact center system as acceptable (e.g., low or normal), unacceptable (e.g., high), and/or other classifications and/or levels of classification therebetween. As can be appreciated, the resource load information in the field 372 may include a percentage of resource utilization accompanied by one or more times and/or timestamps. This field 372 may be used by the scaling mechanism 124 in determining whether resource utilization is increasing, decreasing, or maintaining a constant level over time. Increases in resource utilization may serve to indicate that the contact center will require an expansion scaling (e.g., by adding additional contact centers, unprovisioned resources 114, 130, etc.). The information provided by resource load information field 372 may be used alone or in combination with any other data field by the scaling mechanism 124 in determining to generate a scaling trigger and/or provide a scaling output.

The key information data type 316 may have a corresponding data structure comprising one or more fields which identify a number of keys created and associated with one or more interactions of a contact center in a key number information field 376, identify key generation timing associated with the creation of keys in a key generation timing information field 380, lifetime information associated with the keys in a key lifetime information field 384, and more.

The key number information field 376 may comprise one or more bits or bit values that identify a number of keys created in a contact center. In particular, new keys created can serve to indicate a number of new interactions at a contact center. The information in the key number information field 376 may include a pointer to a data field (e.g., key generation timing information field 380, key lifetime information field 384, etc.) having one or more times associated with the keys created. Additionally or alternatively, the timing information may be included in the key number information field 376. These times can be represented by a timestamp, time value, iteration value, increment value, decrement value, or other timing value. As can be appreciated, this field 376 may be used by the scaling mechanism 124 in determining whether a number of interactions is increasing, decreasing, or maintaining a constant level over time. Increases in interactions at a contact center may serve to indicate that the contact center will require an expansion scaling (e.g., by adding additional contact centers, resources, servers, and/or other resources, etc.). The information provided by the key number information field 376 may be used alone or in combination with any other data field by the scaling mechanism 124 in determining to generate a scaling trigger and/or provide a scaling output.

The key generation timing information field 380 may comprise data that identifies a timing associated with the creation of one or more keys associated with interactions in a contact center. The information in this field 380 may include a time of when one or more keys were created, a time or value representing how long a key has existed, an average time that a key is lasting, and/or other key timing information. This field 380 may be used by the scaling mechanism 124 in determining whether interactions at the contact center are increasing, decreasing, or maintaining a constant level over time. Increases in interactions may serve to indicate that the contact center will require an expansion scaling (e.g., by adding additional contact centers, resources, servers, and/or other resources, etc.). The information provided by the key generation timing information field 380 may be used alone or in combination with any other data field by the scaling mechanism 124 in determining to generate a scaling trigger and/or provide a scaling output.

The key lifetime information field 384 may comprise data that identifies a lifetime of one or more keys associated with interactions in a contact center. The information in this field 384 may include an expected lifetime of a created key, an actual lifetime of a created key, an expiration time of a created key, and/or other key lifetime information. This field 384 may be used by the scaling mechanism 124 in determining whether interactions at the contact center are lasting beyond expected time limits, lasting within expected time limits, and/or falling short of expected time limits. Key lifetimes exceeding expected time limits may serve to indicate that the contact center will require an expansion scaling (e.g., by adding additional contact centers, resources, servers, and/or other resources, etc.). Key lifetimes falling short of expected time limits can serve to indicate that the contact center may require a contraction scaling (e.g., by removing resources, etc.). The information provided by the key lifetime information field 384 may be used alone or in combination with any other data field by the scaling mechanism 124 in determining to generate a scaling trigger and/or provide a scaling output.

The "other data" data type 320 may include information from one or more sources associated with the contact center. In some embodiments, the other data 320 may include information harvested from one or more social networks, forums, chat rooms, websites, search engine queries, and/or other information. The information in other data 320 may be data mined by the scaling mechanism 124 in determining, or inferring, at least one trend. The inferred trend may serve to indicate whether a contact center should be scaled (e.g., expanded, contracted, etc.) or not (e.g., maintained at existing levels, etc.). The information provided by other data 320 may be used alone or in combination with any other data field by the scaling mechanism 124 in determining to generate a scaling trigger and/or provide a scaling output.

It is anticipated that the information in the various data types can be used by the scaling mechanism 124 in determining one or more specific scaling triggers, or groups of scaling triggers, associated with contact center changes. For instance, as the scaling mechanism 124 analyzes data received from the one or more data types, the mechanism 124 may determine that particular information corresponds with activity at the contact center. Increases in activity may require a scaling of the contact center by expansion, while decreases in activity may benefit from a scaling of the contact center by contraction (e.g., removing resources from a provisioned state, etc.).

As can be appreciated, the scaling mechanism 124 may dynamically determine to add or remove scaling triggers upon determining that the scaling triggers are not adequately indicating a required expansion or contraction of a contact center. For instance, in the event that a contact center expands on the basis of a particular scaling trigger, and the scaling mechanism 124 subsequently determines that the expanded resources of the contact center are underutilized, the scaling mechanism 124 may determine to remove the scaling trigger from memory. Conversely, in the event that a contact center expands on the basis of a particular scaling trigger, and the scaling mechanism 124 subsequently determines that the expanded resources of the contact center are being appropriately utilized, the scaling mechanism 124 may determine to maintain the scaling trigger in memory. In some cases, the scaling triggers may be graded based on an accuracy and/or consistency associated with scaling determinations made. Additionally or alternatively, in the event that a contact center contracts on the basis of a particular scaling trigger, and the scaling mechanism 124 subsequently determines that the contracted resources of the contact center are over-utilized, the scaling mechanism 124 may determine to remove the scaling trigger from memory. In the event, however, that a contact center contracts on the basis of a particular scaling trigger, and the scaling mechanism 124 subsequently determines that the contracted resources are adequately handling work items (e.g., handling work items efficiently, and/or within predetermined performance standards stored in memory), the scaling mechanism 124 may determine to maintain the scaling trigger in memory.

FIG. 4 is a block diagram depicting an activity data structure 400 used in accordance with embodiments of the present disclosure. In some embodiments, the activity data structure 400 may correspond to a partitioned in-memory data grid or other partitioned memory. In addition to the data described in conjunction with FIG. 3, the scaling mechanism 124 may monitor specific categories of activity data. These categories of activity data may include resource additions 404, resource subtractions 408, contact volume 412, contact center locations 416, contact center attributes 420, data volume 424, and more 428.

In some embodiments, the data received from the one or more sources as provided in FIG. 3 may be stored in memory 136 based on at least one category associated with the data. For instance, information corresponding to resource additions made at a contact center over time may be stored in resource additions field 404. Similarly, information corresponding to resource subtractions, or removals, made from a contact center over time may be stored in resource subtractions field 408. The contact volume field 412 may include such data as a number of new keys generated over time (e.g., provided from key information data type 316, etc.), a size of data (e.g., from size information field 328, etc.) associated with one or more interactions, and/or other data corresponding to a volume, or number, of contacts being handled (e.g., assigned to at least one resource, work queue, and/or processed via a work assignment mechanism 116, etc.) at the contact center over time.

The contact center locations information field 416 and/or the contact center attributes field 420 may include information corresponding to one or more contact center locations associated with the group of provisioned resources 112 of the contact center. In some embodiments, the fields 416, 420 may include attribute information associated with a contact center (e.g., from resource data 312, etc.), load information (e.g., from hardware data 308, resource data 312, etc.), or other contact centers information.

The data volume information field 424 may include information relating to an exchange of data between the customer communication devices 108 and the group of provisioned resources 112. In some embodiments, the data volume information field 424 may include interaction data 304 corresponding to one or more interactions at the contact center. It should be appreciated that any of the data described in conjunction with FIG. 3 can be stored in one or more of the data fields of the activity data structure 400. Additionally or alternatively, the scaling mechanism 124 may analyze this data from the activity data structure 400. In some embodiments, the scaling mechanism 124 may employ big data analytics to parse and analyze the activity data received.

FIG. 5 is a block diagram depicting a triggering data structure 500 used in accordance with embodiments of the present disclosure. In particular, the triggering data structure 500 may comprise one or more fields, used by the scaling mechanism 124 in determining whether to provide a scaling output, in which the fields identify scaling economic factors in an economic factors information field 504, identify resource supply factors in a scaling output information field 508, identify resource demand factors in a demand factors information field 512, identify available technology factors in a technology factors information field 516, identify regulations associated with the contact center in a regulations information field 520, identify resource usage factors in a usage factors information field 524, and more 528. In some embodiments, the various fields described in conjunction with FIG. 5 may include rules that govern whether a scaling output 322 is provided to a receiving entity 324.

In some embodiments, the economic factors information field 504 may comprise revenue and/or operational cost information associated with a contact center. For instance, the field 504 may include desired operating cost values of a contact center, maximum operating costs per customer, a maximum number of external resources 114A-N for provisioning based on cost, and/or other cost information. Utilizing information in this field 504, the scaling mechanism 124 may determine to provide a scaling output 322. For instance, a scaling trigger may be determined by the scaling mechanism 124 that defines expansion to a contact center when a certain contact volume threshold value is met or exceeded. When the threshold value is met or exceeded, the scaling mechanism 124 may refer to the economic factors information field 504 to determine whether a scaling output 322 can be provided. This determination may be based on rules stored in memory that provide, for example, when a scaling trigger is observed and one or more of the factors stored in the triggering data structure 500 are met, the scaling output 322 may be provided. Additionally or alternatively, the rules stored in memory may provide that when a scaling trigger is observed but one or more of the factors stored in the triggering data structure 500 are not met, not providing the scaling output 322. By way of example, when an expansion scaling trigger occurs the scaling mechanism 124 may refer to one or more of the economic factors in the data structure 500 before determining to provide a scaling output 322. Continuing this example, the economic factors may define that expansion is restricted when the operating costs of the contact center are at or above a threshold value. In this case, the contact center may be operating at or above the threshold value, and thus, the scaling output would not be provided. As can be appreciated, the scaling mechanism 124 may refer to information in any one or more of the fields of the triggering data structure 500 based at least partially on the rules stored in memory.

The supply factors information field 508 may comprise information associated with supply levels of one or more resources associated with a contact center. For instance, the supply levels may define a minimum, average, and/or maximum number of resources required at a contact center. In one embodiment, the supply factors may define a required ratio of resources to customers, or work items. In any event, providing a scaling output 322 may require adhering to the supply factors defined in the supply factors information field 508. Utilizing information in this field 508, the scaling mechanism 124 may determine to provide a scaling output 322. It should be appreciated that the information stored in the supply factors information field 508 may be used alone or in combination with any other data field by the scaling mechanism 124 in determining to provide a scaling output 322.

The demand factors information field 512 may comprise information associated with demands by one or more customers associated with a contact center. For instance, the demand factors may define a minimum, average, and/or maximum number of demands made for one or more resource at a contact center before a scaling output 322 is provided. In one embodiment, the demand factors may define a required number of demands for a particular resource, skill, attribute, etc. In any event, providing a scaling output 322 may require adhering to the demand factors defined in the demand factors information field 512. Utilizing information in this field 512, the scaling mechanism 124 may determine to provide a scaling output 322. It should be appreciated that the information stored in the demand factors information field 512 may be used alone or in combination with any other data field by the scaling mechanism 124 in determining to provide a scaling output 322.

The technology factors information field 516 may comprise information associated with the technology of a contact center. These technology factors may define a technology at the contact center required before a scaling output 322 is provided. In one embodiment, the technology may include hardware and/or software capabilities of the contact center. For example, a contact center may be required to provide a scaling input 322 (e.g., to expand the resources of a contact center, etc.) when the contact center does not possess a required technology included in the technology factors information field 516. The scaling mechanism 124 may determine to provide a scaling output 322 when one or more of the factors in this field 516 are satisfied. It should be appreciated that the information stored in the technology factors information field 516 may be used alone or in combination with any other data field by the scaling mechanism 124 in determining to provide a scaling output 322.

The regulations information field 520 may comprise information associated with the regulations corresponding to a contact center or a specific manner of operating a contact center. In some embodiments, the regulations may provide restrictions, rules, and/or other guides associated with providing a scaling output 322. The scaling mechanism 124 may determine to provide a scaling output 322 when one or more of the regulations in this field 520 are satisfied (e.g., as based on rules, etc.). It should be appreciated that the information stored in the regulations information field 520 may be used alone or in combination with any other data field by the scaling mechanism 124 in determining to provide a scaling output 322.

The usage information field 524 may comprise information associated with a required usage of the contact center in handling customer interactions. The usage information field 524 may include required usage levels, load balancing instructions, and/or processing usage requirements associated with a contact center. In some embodiments, this usage information may define usage rules and/or other guidelines associated with providing a scaling output 322. The scaling mechanism 124 may determine to provide a scaling output 322 when one or more of the usage information rules and/or guidelines contained in this field 524 are satisfied (e.g., as based on rules, etc.). It should be appreciated that the information stored in the usage information field 524 may be used alone or in combination with any other data field by the scaling mechanism 124 in determining to provide a scaling output 322.

Figure 6:
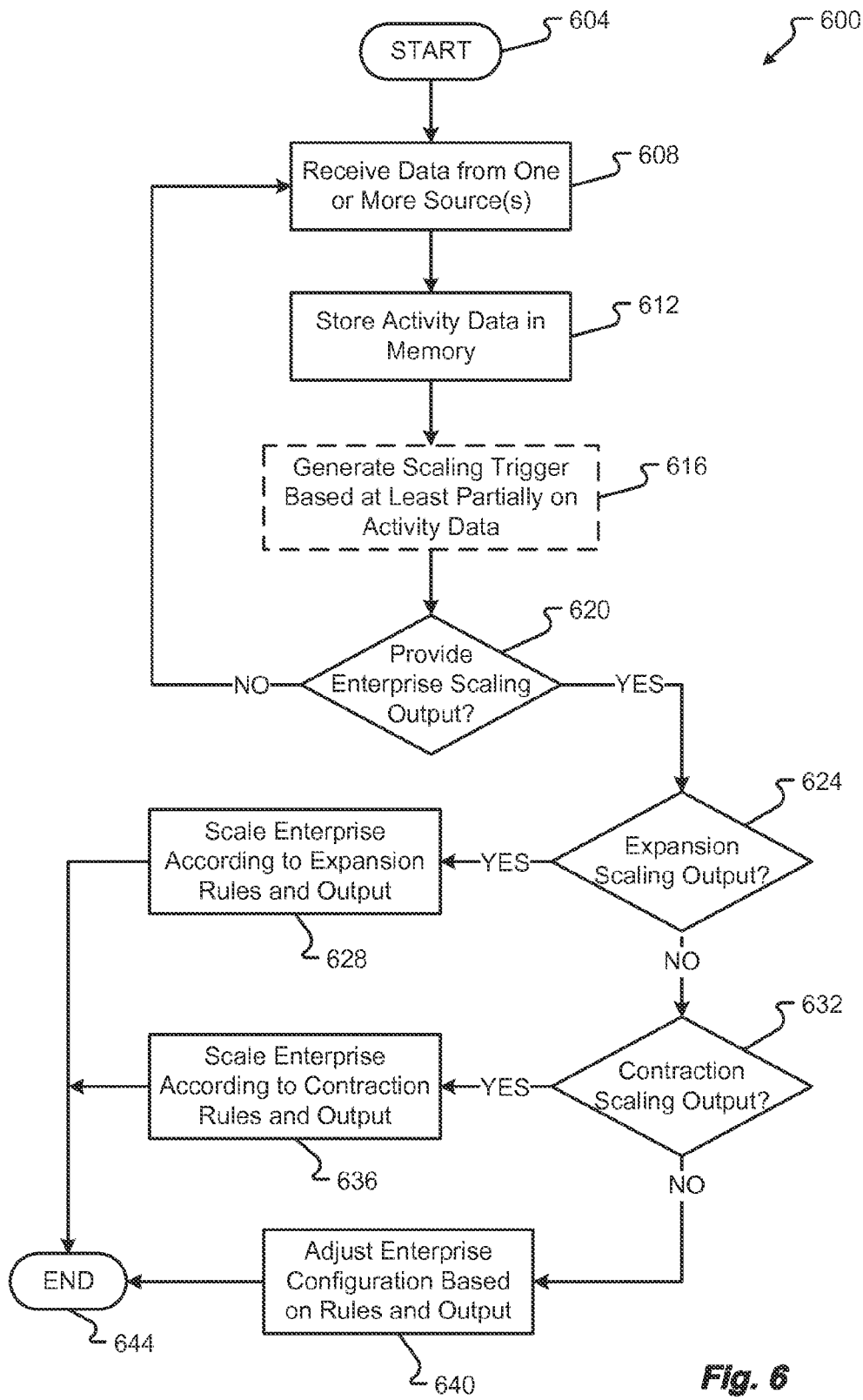
FIG. 6 is a flow diagram depicting a method of dynamically determining contact center scaling in accordance with embodiments of the present disclosure.

FIG. 6 is a flow diagram depicting a method 600 of dynamically determining contact center scaling in accordance with embodiments of the present disclosure. While a general order for the steps of the method 600 is shown in FIG. 6, the method 600 can include more or fewer steps or can arrange the order of the steps differently than those shown in FIG. 6. Generally, the method 600 starts with a start operation 604 and ends with an end operation 644. The method 600 can be executed as a set of computer-executable instructions executed by a computer system and encoded or stored on a computer readable medium. Hereinafter, the method 600 shall be explained with reference to the systems, components, modules, mechanisms, software, data structures, etc., described in conjunction with FIGS. 1-5.

The method 600 begins at step 604 and proceeds when data is received from one or more sources (step 608). The one or more sources may correspond to one or more components of a contact center (e.g., resources 112A-N, 112X, work assignment mechanism 116, work assignment engine 120, routing engine 128, context engine 132, etc.). Additionally or alternatively, the one or more sources may correspond to sources external to a contact center and/or across a communication network 104 (e.g., customer communication devices 108, external resources 114A-N, information sources 140, etc.). In any event, the data may be provided to the scaling mechanism 124 and/or its various components.

It is anticipated that the data may be provided to the scaling mechanism 124 via one or more protocols. For example, the data may be provided in response to a query issued by the context engine 132. As another example, the data may be provided to the context engine 132 based on a registration of the one or more sources with a contact center. As yet another example, the data may be provided periodically and/or according to rules stored in memory.

Next, the method 600 may proceed by storing activity data in memory (step 612). In one embodiment, the data received in step 608 may be the activity data stored in step 612. For instance, the one or more sources may be configured to only provide activity data as the data. In some embodiments, the activity data may be filtered from the data provided by the one or more sources. In this example, the filtered activity data may be a subset of the data received in step 608. For example, as data is received by the scaling mechanism 124, the data may be analyzed for activity data. As provided herein, the activity data may correspond to any data that can be used by the scaling mechanism 124 in determining to provide a scaling output 322. The activity data may include a level of activity associated with the contact center at a particular time. Additionally or alternatively, the activity data may correspond to data that is indicative of a level of activity at a contact center (e.g., increasing, decreasing, steady-state or maintaining, etc.) over time. In any event, the activity data may be store in the memory 136. In some embodiments, this stored activity data may be analyzed to determine whether the changes to activity levels are changing over time, and/or whether those changes require a scaling output 322 to be provided.

In some embodiments, one or more scaling triggers may be predefined and these scaling triggers may be stored in memory. Among other things, the scaling triggers can be used by the scaling mechanism 124 when determining whether to generate a scaling output 322. In accordance with embodiments of the present disclosure, the scaling trigger may correspond to one or more scaling trigger criteria, where the scaling trigger criteria corresponds to one or more of factors and data that, when considered alone or together, can serve to determine a scaling need of a contact center. For instance, monitored increases or decreases in interactions at a contact center may by itself serve as a scaling trigger to provide a scaling output 322. Additionally or alternatively, when the activity data includes information that matches the scaling trigger, or scaling trigger criteria, the scaling mechanism 124 may determine to provide the scaling output 322.

The method 600 may optionally continue by determining to generate a scaling trigger based at least partially on the activity data (step 616). Generating scaling triggers may include adding new scaling triggers to memory, altering existing scaling triggers in memory, removing scaling triggers from memory, and/or classifying one or more of the scaling triggers in memory. In some embodiments, the scaling triggers may be classified according to an effectiveness, repeatability, and/or other grade. This classification may include adding an identifier to at least one data structure associated with the scaling trigger. In any event, these scaling triggers may be generated by observing changes in activity data over time. In some embodiments, this observation may include monitoring changes in activity data after providing a scaling output and/or not providing a scaling output. For instance, a first group of activity data may indicate that a contact center activity is increasing, but a scaling trigger may not be associated with the first group of activity data. Continuing this example, if the scaling output is not provided, the contact center may experience low performance or suffer from an overutilization of resources. In this case, the first group of activity data may be used by the scaling mechanism 124 to automatically associate that the first group of activity data with a scaling trigger. It should be appreciated, that the scaling mechanism 124 may determine to automatically generate scaling triggers (e.g., expansion scaling triggers, contraction scaling triggers, etc.) based on the activity data and/or a number of factors stored in memory (e.g., market conditions, regulations, usage, etc.).

The method 600 proceeds by determining whether to provide a scaling output 322 (step 620). In one embodiment, the scaling mechanism 124 may determine to provide a scaling output based at least partially on at least one of activity data, scaling trigger, and rules stored in memory. For instance, the activity may identify an activity of a contact center and/or a context of the contact center at one or more points in time. This information may be analyzed by the scaling mechanism 124 to determine whether a scaling trigger corresponds to the activity. In the event that the activity matches a scaling trigger, the scaling mechanism 124 may refer to rules stored in memory to determine whether to provide a scaling output 322. These rules may include one or more factors that, when satisfied, allow the scaling mechanism 124 to provide a scaling output 322. Additionally or alternatively, the rules may include one or more factors that, when not satisfied, prevent or deny the scaling mechanism 124 from providing a scaling output 322. In any event, the one or more factors may correspond to the factors and/or information described in conjunction with FIG. 5.

When it is determined to provide a scaling output 322, the method 600 continues by determining the type of scaling output 322 provided. Depending on the activity data and the corresponding contact center scaling activity determined, the method 600 may determine to provide one of an expansion scaling output, a contraction scaling output, or a rules-based scaling output.

The method 600 may continue by determine whether the scaling output 322 is an expansion scaling output (step 624). In the event that the scaling output 322 is an expansion scaling output, the method 600 may proceed to scale the contact center, or enterprise, according to expansion rules stored in memory (step 636). In some embodiments, the rules for scaling the contact center upon receiving an expansion scaling output may define adding one or more unprovisioned internal resources 112X from an internal unprovisioned group 130. In one embodiment, the rules for scaling the contact center upon receiving an expansion scaling output may define adding one or more unprovisioned external resources 114A-N from an external unprovisioned group 114. In some cases, the external unprovisioned group 114 may include one or more other contact centers. Other examples of expanding a contact center may be described in conjunction with FIG. 7. Once the contact center is expanded according to the rules stored in memory, the method 600 ends at step 644.

In some embodiments, the method 600 may continue by determine whether the scaling output 322 is a contraction scaling output (step 632). In the event that the scaling output 322 is a contraction scaling output, the method 600 may proceed to scale the contact center, or enterprise, according to contraction rules stored in memory (step 636). In some embodiments, the rules for scaling the contact center upon receiving a contraction scaling output may define removing one or more provisioned resources 112A-N from a provisioned group of resources 112. In one embodiment, the rules for scaling the contact center upon receiving a contraction scaling output may define releasing one or more provisioned resources 112A-N to an unprovisioned group of resources 114, 130. In some cases, the unprovisioned group of resources 114 may be external to the contact center and include one or more other contact centers. Other examples of contracting a contact center may be described in conjunction with FIG. 7. Once the contact center is contracted according to the rules stored in memory, the method 600 ends at step 644.

In one embodiment, the scaling output 322 provided may be a rules-based instruction scaling output. In this embodiment, the method 600 may continue by adjusting a current contact center configuration based on one or more instructions contained within the provided scaling output 322 (step 640). This adjustment may include removing, or releasing, particular resources from the group of provisioned resources 112 and replacing those released particular resources with one or more replacement resources. As can be appreciated, the replacement resources may be any of the resources 112X, 114A-N as disclosed herein. For example, the scaling mechanism 124 may observe that one or more particular resources of the currently provisioned resources 112A-N are not handling work items in an efficient manner. This inefficiency may be based on attribute data associated with the one or more particular resources. In some embodiments, the scaling mechanism 124 may observe that similar work items are being efficiently handled by other resources of the currently provisioned resources 112A-N. Based on this information, the scaling mechanism 124 may determine that an adjustment is needed to remove the inefficient resources and replace them with resources having similar attributes to the other resources handling the work items efficiently. Once the adjustment to the contact center configuration is made, the method 600 ends at step 644.

Figure 7:
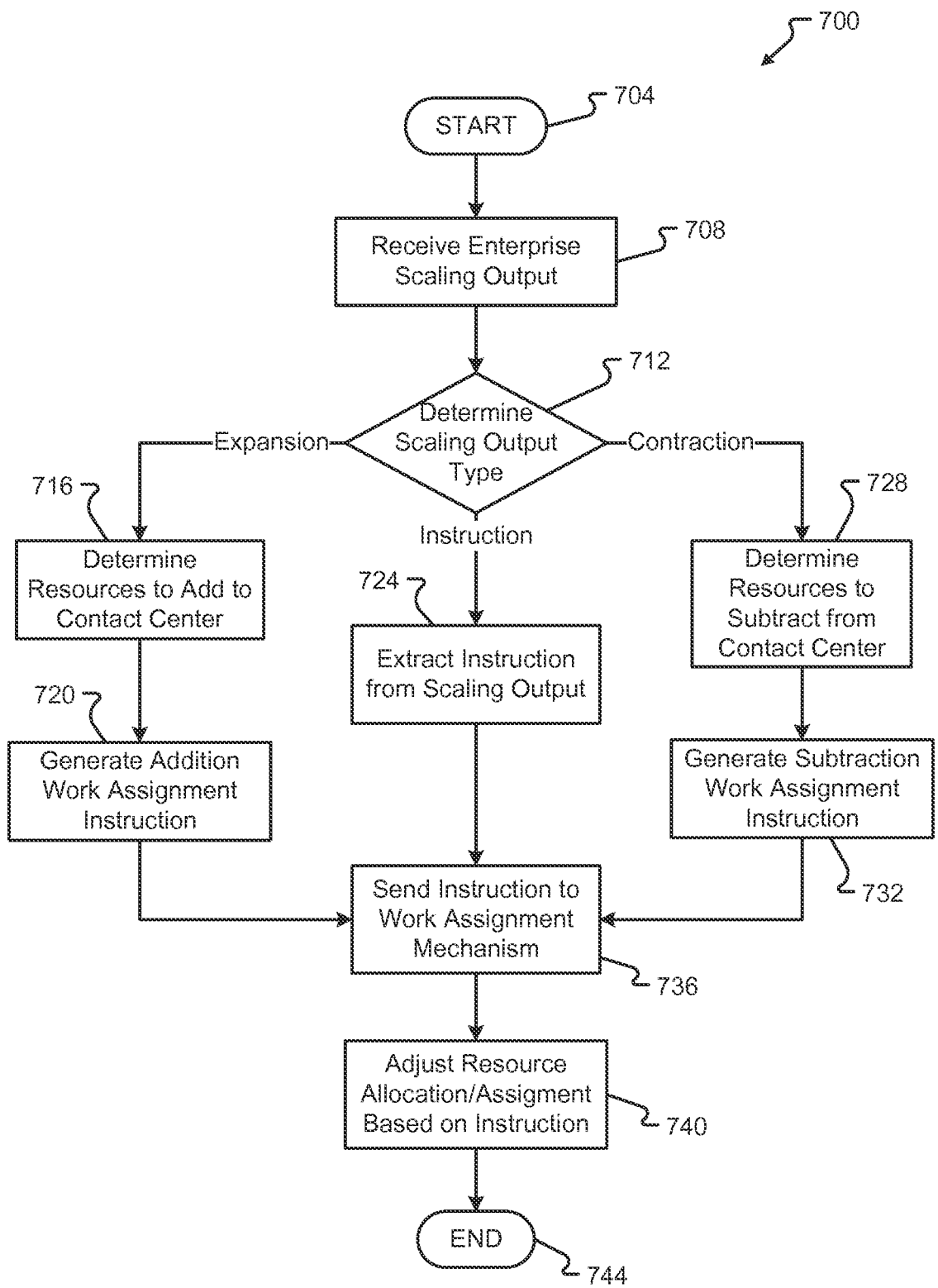
FIG. 7 is a flow diagram depicting a method of automatically scaling a contact center based on a scaling output in accordance with embodiments of the present disclosure.

FIG. 7 is a flow diagram depicting a method of automatically scaling a contact center based on a scaling output in accordance with embodiments of the present disclosure. While a general order for the steps of the method 700 is shown in FIG. 7, the method 700 can include more or fewer steps or can arrange the order of the steps differently than those shown in FIG. 7. Generally, the method 700 starts with a start operation 704 and ends with an end operation 744. The method 700 can be executed as a set of computer-executable instructions executed by a computer system and encoded or stored on a computer readable medium. Hereinafter, the method 700 shall be explained with reference to the systems, components, modules, mechanisms, software, data structures, etc., described in conjunction with FIGS. 1-6.

The method 700 begins at step 704 and proceeds when a scaling output 322 is received (step 708). The scaling output 322 may be similar, if not identical, to the scaling output described in conjunction with FIG. 6. In some embodiments, the scaling output 322 may be received by the work assignment mechanism 116 of the contact center. As can be appreciated, the work assignment mechanism 116 may add (e.g., provision) and/or remove (e.g., release) one or more resources in work assignments at the contact center. In one embodiment, the scaling mechanism 124 may instruct the work assignment mechanism 116 to make particular work assignments based on the scaling output 322 received.

Next, the method 700 proceeds by determining the scaling output type (step 712). As described above, the scaling output type may include one of an expansion scaling output, an instruction (e.g., rules-based, etc.) scaling output, or a contraction scaling output. In one embodiment, the type of scaling output may be identified by information contained in one or more data fields of a data structure associated with the scaling output. For instance, the scaling output 322 may be sent as a message having an information carrying portion (e.g., a header, footer, and/or payload, etc.). In accordance with embodiments of the present disclosure, this message may be sent in one or more packets across a communication path between the one or more components of the contact center. In some embodiments, the message may be sent between one or more components as one or more packets across a communication network 104. In any event, the scaling output type may be extracted or identified from at least a portion of the message.

In the event that the scaling output type is determined to be an expansion scaling type, the method 700 proceeds by determining one or more resources 112X, 114A-N to add to the contact center (step 716). In some embodiments, this determination may be based on activity information (e.g., derived from the activity data, the activity data itself, etc.) provided in the scaling output 322. Activity information may identify one or more skills, attributes, number of resources, groups of resources, and/or other information that may aid in determining which resources to add in an expansion scaling. The resources to be added to the group of provisioned resources 112 may be selected from one or more internal groups 130 and external groups 114.

Next, the method 700 proceeds by generating an addition work assignment instruction (step 720). The addition work assignment instruction may include one or more selected resources based on the determination described in conjunction with step 716. The work assignment instruction may be configured as a message, bit stream, one or more packets, program code, etc., and/or the like. The method 700 continues by sending the instruction to at least one component of the work assignment mechanism 116 (step 736).

In some embodiments, the scaling output type may be an instruction scaling type, in which case, the method 700 proceeds by extracting a configuration adjustment instruction from the scaling output. The configuration adjustment instruction may include one or more instructions that adjust a current configuration of the contact center. This may include an instruction to replace one or more provisioned resources 112A-N in the contact center. In some cases, the configuration adjustment instruction may be configured as a work assignment instruction. As can be appreciated, the configuration adjustment instruction may be configured as a message, bit stream, one or more packets, program code, etc., and/or the like. The method 700 may continue by sending the instruction to at least one component of the work assignment mechanism 116 (step 736).

In the event that the scaling output type is determined to be a contraction scaling type, the method 700 proceeds by determining one or more resources 112A-N to release from the provisioned group of resources 112 of the contact center (step 728). In some embodiments, this determination may be based on activity information (e.g., derived from the activity data, the activity data itself, etc.) provided in the scaling output 322. Activity information may identify one or more skills, attributes, number of resources, groups of resources, and/or other information that may aid in determining which resources to release in a contraction scaling.

Next, the method 700 proceeds by generating a subtraction work assignment instruction (step 732). The subtraction work assignment instruction may include one or more resources 112A-N to remove from the provisioned group of resources 112 based on the determination described in conjunction with step 728. The work assignment instruction may be configured as a message, bit stream, one or more packets, program code, etc., and/or the like. The method 700 continues by sending the instruction to at least one component of the work assignment mechanism 116 (step 736).

Upon receiving the instruction, the method 700 continues by adjusting the composition of the provisioned group of resources 112 based on the instruction (step 740). More specifically, the work assignment mechanism 116 may make adjustments to the provisioned group of resources 112 based on information contained within the instruction. Where the information includes one or more resources to add to the contact center, the instruction may include a number of resources required, particular resource types, names, identifiers, attributes of resources, and/or combinations thereof. The work assignment mechanism 116 may then assign work items of the contact center and/or work items arriving at the contact center to the added resources.

In the event that the information contained within the instruction includes one or more provisioned resources 112A-N of the contact center to replace with other resources 112X, 114A-N of the contact center, the instruction may include a number of resources, particular resource types, names, identifiers, attributes, and/or combinations thereof associated with resources 112A-N being replaced. In one embodiment, the instruction may include information describing a number of resources, particular resource types, names, identifiers, attributes, and/or combinations thereof associated with resources 112X, 114A-N being provisioned to replace the removed resources. The work assignment mechanism 116 may then assign work items of the contact center and/or work items arriving at the contact center to the newly provisioned resources that replaced the removed resources.

When the information within the allocation instruction includes one or more resources to remove from the provisioned group of resources 112 at the contact center, the instruction may include a number of resources, particular resource types, names, identifiers, attributes of resources, and/or combinations thereof associated with the one or more resources 112A-N to be removed from the provisioned group of resources 112. The work assignment mechanism 116 may then assign work items of the contact center and/or work items arriving at the contact center to the one or more resources 112A-N remaining in the provisioned group of resources 112. The method 700 ends at step 744.

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A contact center, comprising:
 a processor; and
 a computer-readable medium coupled with the processor, the computer-readable medium comprising instructions that are executable by the processor, the instructions comprising:
  a scaling mechanism which causes the processor to automatically determine a level of activity associated with the contact center at one or more time periods based at least partially on activity data provided by one or more information sources communicatively connected to the contact center, wherein the activity data comprises key information comprising data corresponding to a generation of keys for interactions between customer communication devices and resources of the contact center, wherein the scaling mechanism further causes the processor to determine whether the level of activity matches at least one scaling trigger for scaling the contact center and to automatically scale the contact center by adjusting a configuration of a group of provisioned resources associated with the contact center when the level of activity matches the at least one scaling trigger.

2. The contact center of claim 1, wherein the processor determines whether the level of activity matches at least one scaling trigger for scaling the contact center by comparing first activity data received at a first time period to second activity data received at a second time period for an increase or decrease in the level of activity, wherein increases in the level of activity over time provide an expansion scaling adjustment, and wherein decreases in the level of activity over time provide a contraction scaling adjustment.

3. A method, comprising:
 receiving, at a processor of a contact center, activity data provided from one or more sources communicatively connected to the contact center, wherein the activity data corresponds to a level of activity associated with the contact center at a time that the activity data is provided, and wherein the activity data comprises key information comprising data corresponding to a generation of keys for interactions between customer communication devices and resources of the contact center;
 storing, by the processor, the activity data in a computer-readable medium associated with the processor;
 determining, by the processor, whether the stored activity data matches scaling information; and
 scaling, by the processor, the contact center by automatically adjusting a configuration of a group of provisioned resources associated with the contact center when the stored activity data matches the scaling information.

4. The method of claim 3, wherein determining whether the stored activity data matches scaling information further comprises:
 analyzing, by the processor, the activity data stored in the computer-readable medium for changes over time, wherein increases in the level of activity over time provide an expansion scaling adjustment, and wherein decreases in the level of activity over time provide a contraction scaling adjustment.

5. The method of claim 3, wherein the computer-readable medium comprises a partitioned in-computer-readable medium data grid, and wherein the partitioned in-computer-readable medium data grid is configured for maintaining data in a format for big data analysis by the processor.

6. The method of claim 3, wherein the activity data received at the processor is included in at least one portion of data provided by the one or more sources, and prior to storing the activity data, the method further comprises:
 filtering, by the processor, the activity data from the data provided by the one or more sources; and
 classifying, by the processor, the filtered activity data as a particular type of activity data for storage in a location of the computer-readable medium associated with the processor.

7. The method of claim 3, wherein determining whether the stored activity data matches scaling information further comprises:
 determining, by the processor, whether the stored activity data matches at least one scaling trigger criterion stored in the computer-readable medium.

8. The method of claim 7, wherein prior to scaling the contact center, the method further comprises:
 determining, by the processor, whether rules stored in the computer-readable medium allow for contact center scaling, wherein the rules comprise one or more factors corresponding to a desired operational state of the contact center; and
 allowing, by the processor, contact center scaling only when the stored activity data matches the at least one scaling trigger criterion stored in the computer-readable medium and when a current contact center state matches the desired operational state of the contact center.

9. The method of claim 7, further comprising:
 detecting, by the processor after determining that the stored activity data does not match scaling information, that a contact center has not been scaled;
 monitoring, by the processor, a state of the contact center not scaled;
 determining, by the processor, whether the state of the contact center has fallen below a threshold performance value; and
 generating, by the processor in response to determining that the state of the contact center has fallen below the threshold performance value, a new scaling trigger criterion based at least partially on the stored activity data.

10. The method of claim 7, further comprising:
 monitoring, by the processor, a state of the contact center after the contact center is scaled;

determining, by the processor, whether the state of the contact center has fallen below a threshold performance value; and generating, by the processor in response to determining that the state of the contact center has fallen below the threshold performance value, a new scaling trigger criterion based at least partially on the stored activity data.

11. The method of claim 7, wherein prior to scaling the contact center, the method further comprises:

providing, by the processor, a scaling output identifying a type of scaling instruction when the stored activity data matches the at least one scaling trigger criterion stored in the computer-readable medium, and wherein the scaling instruction defines the adjustment to the configuration of the group of provisioned resources.

12. The method of claim 11, wherein the type of scaling instruction comprises information for one of expanding and contracting the group of provisioned resources associated with the contact center, wherein expanding the group comprises adding one or more resources to the group, and wherein contracting the group comprises releasing one or more resources from the group of provisioned resources.

13. A server, comprising:

a processor; and a computer readable medium, coupled to the processor and comprising instructions stored thereon that cause the processor to:

automatically determine a level of activity associated with a contact center over time, wherein the level of activity is based at least partially on key information generated for interactions between communication devices of customers and resources of the contact center over time, wherein the key information comprises a number of keys generated by the processor, a timing for each of the number of keys generated, or a key lifetime for each of the number of keys generated;

automatically determine whether the level of activity matches at least one scaling trigger for scaling the contact center; and automatically scale the contact center by adjusting a configuration of a group of provisioned resources associated with the contact center when the level of activity matches the at least one scaling trigger.

14. The server of claim 13, wherein the key lifetime for each of the number of keys generated comprises an amount of time that a key associated with a particular interaction at the contact center has existed.

15. The server of claim 14, wherein the processor is further caused to:

automatically determine whether the key lifetime for at least one of the number of keys generated exceeds a predetermined threshold.

16. The server of claim 15, wherein the processor is further caused to:

analyze attributes of interactions with key lifetimes exceeding the predetermined threshold; and provide an expansion scaling adjustment adding at least one resource to the interactions with key lifetimes exceeding the predetermined threshold, the at least one resource comprising one or more attributes that are different from the analyzed attributes.

17. The server of claim 13, wherein the level of activity is based at least partially on interaction data for the interactions between the communication devices of customers and the resources of the contact center over time.

18. The server of claim 17, wherein the interaction data comprises a size of data associated with a particular interaction at the contact center, an identification of one or more links to sites or pages viewed in the particular interaction, and notes or comments associated with the particular interaction.

19. The server of claim 18, wherein the level of activity is based at least partially on resource data for the contact center over time, the resource data comprising information defining whether a particular resource is in the group of provisioned resources or in a group of unprovisioned resources.

20. The method of claim 3, wherein the activity data comprises interaction data for the interactions of the contact center, wherein the interaction data comprises one or more of a size of data associated with a particular interaction at the contact center, an identification of one or more links to sites or pages viewed in the particular interaction, or notes or comments associated with the particular interaction, and resource data comprising information defining whether a particular resource is in the group of provisioned resources or in a group of unprovisioned resources.

* * * * *